United States Patent
Berndt et al.

[15] 3,668,871
[45] June 13, 1972

[54] HYDRAULIC REMOTE CONTROL DEVICE

[72] Inventors: Hans Berndt; Hubert Kreuzer, both of Donau, Germany

[73] Assignee: Neuweg Fertigungs GmbH, Munderkinger Wurttemberg, Germany

[22] Filed: July 13, 1970

[21] Appl. No.: 54,358

[30] Foreign Application Priority Data

July 16, 1969 Germany..................G 69 28 117

[52] U.S. Cl..............................................60/54.5 R, 92/98 D
[51] Int. Cl..............................................F15b 7/00
[58] Field of Search......................60/54.5 R; 92/98, 99, 101

[56] References Cited

UNITED STATES PATENTS

| | | |
|---|---|---|
| 3,553,967 | 1/1971 | Porter et al.............................60/54.5 |
| 3,173,263 | 3/1965 | Porter......................................60/54.5 |
| 2,733,572 | 2/1956 | Butterfield et al.....................60/54.5 |
| 2,131,815 | 10/1938 | Nilson....................................60/54.5 |
| 3,129,604 | 4/1964 | Hanson..................................60/54.5 |
| 3,226,931 | 1/1966 | Bauer.........................................92/98 |

*Primary Examiner*—Martin P. Schwadron
*Assistant Examiner*—A. M. Zupcic
*Attorney*—Hume, Clement, Hume & Lee

[57] ABSTRACT

A hydraulic remote control apparatus is provided for use in operating short-stroke valves located in the piston of an adjustment cylinder for adjustable back rests. The apparatus includes a pair of remotely located hydraulic chambers interconnected by means of a fluid-carrying conduit. A first hydraulic chamber is provided with a diaphragm and disk arrangement which spans the chamber to form fluid-tight operating and control compartments therein. A second hydraulic chamber has a smaller cross-section than the first chamber and is provided with a rolling elastomeric diaphragm so that the volume of the second hydraulic chamber can be reduced by displacement of the plunger in a manner sufficient to deflect the rolling diaphragm.

6 Claims, 2 Drawing Figures

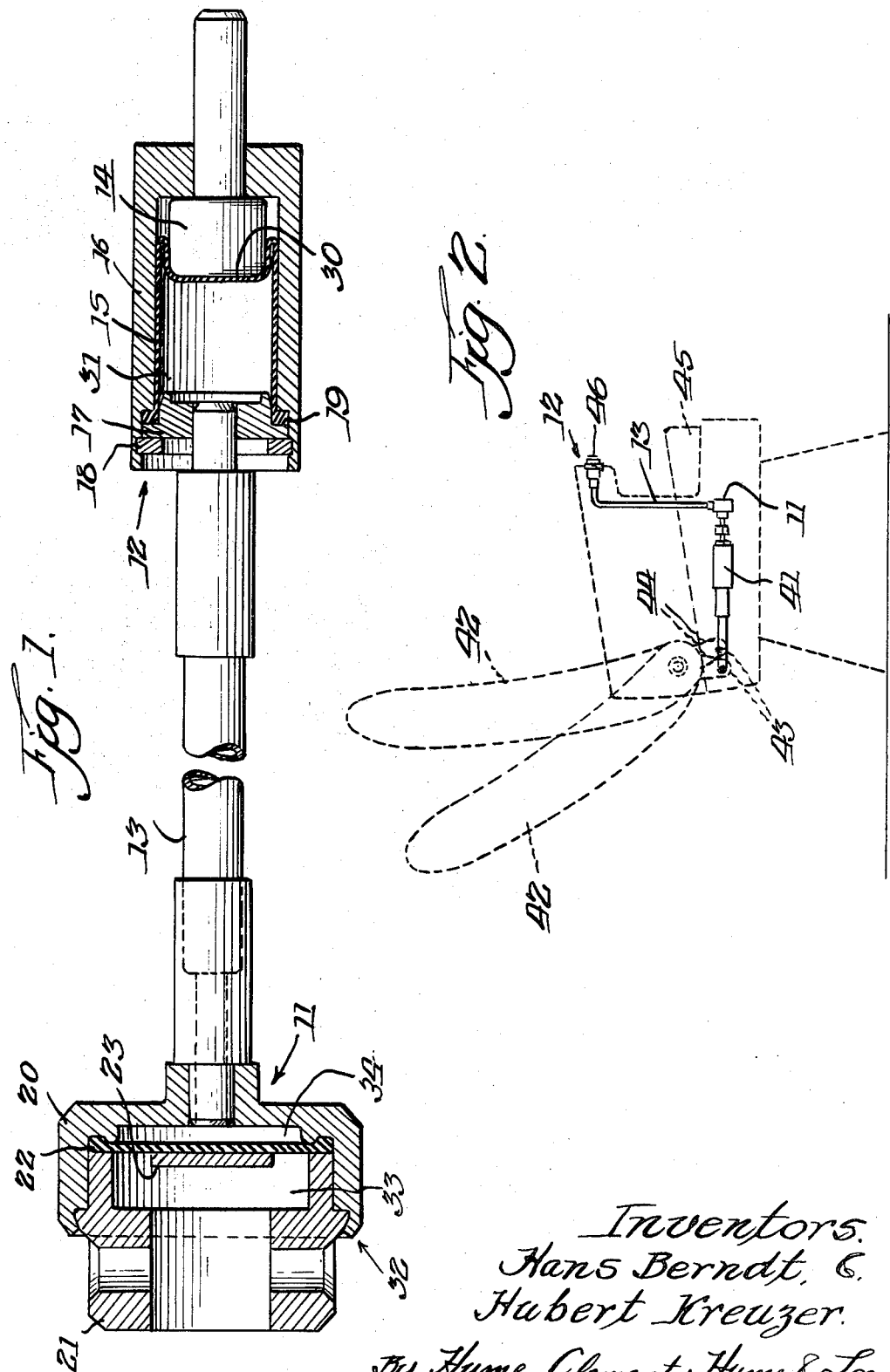

HYDRAULIC REMOTE CONTROL DEVICE

BACKGROUND OF THE INVENTION

This invention relates generally to an apparatus for transmitting a force between two remotely located members, and more particularly, deals with the hydraulic remote control of short-stroke valves located in the piston of an adjustment cylinder for tiltable back rests, such as those used on reclining seats in aircraft and other vehicles.

A typical hydraulic remote control device of the type to which this invention pertains uses a column of liquid in a small diameter flexible tube to transmit valve-opening thrust to a control rod from a remotely located control station. This type hydraulic system employs a control chamber at the remote control station which is adapted for manually operable change in its volume to cause fluid displacement throughout the length of a hydraulic tube. In general, a cylinder with a piston in the form of a plunger is used to effect fluid displacement. The plunger is shifted, for example, when desired by manual depression of a knob at the outer end of the plunger. Liquid that is displaced through the length of the tube by means of the plunger tends to act against a diaphragm adjacent to a hydraulic lock which then flexes to apply operating thrust to the end of a valve-controlled rod. Typically, spring devices are used in such hydraulic remote control assemblies to actuate both the advance and return operations of the control assembly.

Although such hydraulic control devices have been accepted for use in controlling tiltable back rests, their utilization has not been without numerous disadvantages. For example, the large number of working parts necessary to effect the control function of such devices have made them somewhat unreliable and short-lived. In addition, actual operation of such devices has been accompanied by high operating forces which, in turn, lead to considerable friction losses and an inevitably large number of fluid leaks in the operating and control chambers.

Accordingly, a need has developed for an improved hydraulic remote control device which has a small number of working parts, is highly reliable in operation, completely fluid tight in either operating or stationary modes, and has markedly reduced energy losses through friction.

SUMMARY OF THE INVENTION

According to this invention, an apparatus for hydraulic operation of a remotely located control member of some type is provided for use in operating tiltable back rests in aircraft seats or the like. Specifically, the hydraulic remote control apparatus includes a pair of spaced hydraulic chambers interconnected by a fluid-carrying conduit.

A first hydraulic chamber has an outer housing containing a flexible diaphragm and disk arrangement spanning the housing and dividing it into separate fluid tight operating and control compartments. The disk, in turn, abuts the diaphragm at one face and an operating member used to control an externally located control device at its opposite face.

A second hydraulic chamber of smaller cross-section than the first chamber and remotely located therefrom includes an outer housing designed to accommodate a slidable plunger device and a rolling elastomeric diaphragm which spans the housing. The plunger device abuts the rolling diaphragm in this second hydraulic chamber and permits a deflection of the diaphragm sufficient to displace fluid from the second chamber and, thus, apply an operative pressure to the disk-diaphragm assembly spanning the first chamber.

The rolling elastomeric diaphragm disposed in this second hydraulic chamber performs both fluid sealing and reset functions in that an inward displacement of the plunger device deflects the rolling diaphragm and displaces fluid, while a release of the inward force on the rolling diaphragm permits the diaphragm to roll against the plunger in order to automatically return the plunger to its starting position.

In contrast to prior art control devices, the hydraulic remote control device of this invention has more certain and reliable operating characteristics as a result of its relatively small number of working parts. For example, the remote control device of this invention operates without the need for springs to effect the advance and return operations of the device, but rather employs the reflex action of the rolling elastomeric diaphragm for return operation.

Moreover, the overall dimensions of the hydraulic remote control device of this invention are quite small in relation to known control devices, and the construction of this device is highly fluidtight since only two static seals are required in the entire system. Finally, through a marked reduction in friction losses, the operational life of the hydraulic remote control device of this invention is considerably increased.

BRIEF DESCRIPTION OF THE DRAWINGS

The hydraulic remote control apparatus of this invention will be more readily understood by reference to the following drawings in which:

FIG. 1 is a side elevational view partly in cross-section of one embodiment of this invention showing the first and second hydraulic chambers interconnected by means of a fluid-carrying conduit; and FIG. 2 is a diagrammatic view of the hydraulic remote control apparatus of this invention in combination with a hydraulic lock used for control of a tiltable back rest for an airplane seat or the like.

DESCRIPTION OF THE PREFERRED EMBODIMENTS

Referring now to the drawings, and more particularly to FIG. 1, it can be seen that the hydraulic remote control apparatus of this invention generally comprises two hydraulic chambers 11 and 12 arranged at a distance from each other and interconnected by means of a flexible fluid-carrying conduit 13. A manually operable plunger 14 protrudes into chamber 12 and is in operating connection with a rolling diaphragm 15. Displacement of plunger 14 causes a shifting of the hydraulic column of fluid in the remote control apparatus.

Generally, hydraulic chamber 12 is characterized by a cylindrical member 16 and a sealing member 17 which is held in place by means of ring 18 and pressed in a tensioning member against the collar-like end 19 of rolling diaphragm 15. It should be understood, however, that chamber 12 can be formed by two connectable parts in some other manner so long as these parts are designed to clamp the open end of rolling diaphragm 15 therebetween.

Hydraulic chamber 11 generally consists of two telescoping members 20 and 21 which serve to jointly tension diaphragm 22 within the chamber. Diaphragm 22 is designed to exert an elastic resetting and sealing operation for the hydraulic remote control apparatus of this invention. Metallic disk 23 is provided on one side of diaphragm 22.

Upon the application of pressure to plunger 14, the hydraulic column of liquid disposed within the control apparatus is put in motion by means of rolling diaphragm 15. As a result, diaphragm 22 in chamber 11 is deflected and, in turn, acts upon an operating stem of a valve or the like on some external system. When the manual displacement of plunger 14 is stopped, diaphragm 22 releases by its own resetting force and returns rolling diaphragm 15 and plunger 14 into their non-operating or starting positions.

More specifically, however, the remote control apparatus of this invention comprises a first hydraulic chamber 11, referred to as a working side, and a second hydraulic chamber 12, referred to as an actuating side, which are remotely spaced and interconnected by means of a fluid-carrying conduit 13. Generally, conduit 13 is constructed from a flexible, high-pressure type tubing, which preferably does not expand or extend under pressure but can easily bend or flex.

The second hydraulic chamber 12 (or actuating side of the control apparatus) includes an outer housing 16, preferably in the form of a cylinder, a rolling elastomeric diaphragm 15 disposed within the housing and a slidable piston or plunger device 14 disposed within housing 16 and abutting the closed end of the rolling elastomeric diaphragm 15.

Rolling diaphragm 15 is preferably constructed from an elastomeric material, such as rubber, which is usually highly resistant to attack by oil or the like. As shown in FIG. 1, rolling diaphragm 15 is rather tightly contained within housing 16 and has a closed end 30 which abuts plunger 14 and a collar-like open end 19 which extends around the peripheral edge of the housing. It should be noted, however, that plunger 14 is in no way fastened to rolling diaphragm 15 but rather merely abuts or rests against it as shown in FIG. 1.

Rolling diaphragm 15 is held within housing 16 by means of cover 17 which fits within the housing and acts as a clamp for the open ends 19 of the diaphragm. A clip or ring 18 is placed over cover 17 in order to securely hold the rolling diaphragm within the housing and to form a hydraulic chamber 31 integral with the outer housing.

The first hydraulic chamber 11 (working side of the apparatus) includes an outer housing 32 and a flexible diaphragm 22, preferably made from an elastic material such as rubber, which spans housing and forms two separate fluid-tight compartments therein. An operating compartment 33 is formed on one side of diaphragm 22 and a control compartment 34 on the opposite side.

A metallic disk 23, as illustrated in FIG. 1, is secured to diaphragm 22 and is contained within operating chamber 33. In addition, an operating member of some sort (not shown) can also be housed within operating chamber 33 and attached in some manner to disk 23 so that displacement of the disk-diaphragm arrangement can effect some measure of control over an externally located control device. For example, an operating member, such as a short-stroke valve located on the piston of an adjustment cylinder, shown generally at 41 in FIG. 2, can be controlled by the movement of disk 23 and diaphragm 22 contained within operating chamber 33. It should be understood, however, that a variety of other external devices can also be conveniently controlled by means of the hydraulic remote control apparatus of this invention.

In actual operation, chambers 31 and 34 and conduit 13 are filled with a hydraulic fluid. As plunger 14 is pressed against rolling diaphragm 15 and into chamber 31, a reduction in the volume of chamber 31 takes place and hydraulic fluid is moved from chamber 31 through conduit 13 and into chamber 34 on the working side of the overall control apparatus. The result of this fluid displacement is to deflect diaphragm 22 and disk 23 in an axial direction.

When used in combination with a short-stroke valve located in the piston of an adjustment cylinder for tiltable back rests, as shown in FIG. 2, the remote control apparatus of this invention is used to control adjustment cylinder 41 which, in turn, controls the position of back rest 42. Adjustment cylinder 41 serves as an extensible link, one end of the link being connected by a pirot bolt 43 to a bracket 44 for attachment to the tiltable back rest 42.

When an occupant of seat 45 pushes operating knob 46, plunger 14 moves inwardly and hydraulic fluid is displaced against diaphragm 22 and disk 23 in operating compartment 33 with the consequent flexing of the disk-diaphragm arrangement. The flexure of diaphragm 22 moves disk 23 and through the action of a short-stroke valve housed within adjustment cylinder 41, frees back rest 42 for a change in inclination.

In contrast, when an occupant of seat 45 reaches the desired inclination of back rest 42, operating knob 46 is released. With the inward force on plunger 14 removed, diaphragm 22 performs its automatic reset function by returning to its preflexed position and causing hydraulic fluid to flow from chamber 34 through conduit 13 and back into chamber 31. Rolling diaphragm 15 then moves plunger 14 back into its starting position, e.g. resting against the inner circumferential shoulder of housing 16 and adjustment cylinder 41, in turn, locks back rest 42 in the desired position.

The amount of axial movement of plunger 14 will, of course, depend upon the dimensions of hydraulic chambers 11 and 12. As shown in FIG. 1, plunger 14 has a longer stroke than disk 23. Consequently, a small force applied to plunger 14 automatically produces a proportionately larger force on disk 23.

In addition, the relative cross-section of (actuating) chamber 12 is preferably smaller than that of (working) chamber 11. For example, when cylindrical chambers are used, the ratio of the diameter of the working chamber to actuating chamber is operably within the range of 1:1 to 10:1. Preferably, however, the diameter of the working chamber is four times that of the actuating chamber.

Although only several embodiments of this invention have been discussed herein, it should be recognized that various modifications of these embodiments can be made without departing from the spirit and scope of this invention.

We claim:

1. A hydraulic remote control apparatus for transmitting force between two remotely located chambers comprising:
   a pair of remotely spaced hydraulic chambers interconnected by a fluid-carrying conduit;
   said first hydraulic chamber having an outer housing, and a self-resetting flexible diaphragm disposed within and spanning said housing to form separate fluid-tight operating and control compartments therein, said operating compartment enclosing an operating member for an externally located control device, and said control compartment being adapted to accommodate hydraulic fluid;
   a disk member disposed within said operating compartment and having one face thereof abutting said diaphragm and the opposite face engaging said operating member;
   said second hydraulic chamber having an outer housing of smaller cross-section than the housing for said first hydraulic chamber, and a rolling elastomeric diaphragm disposed within said housing and adapted to hydraulically seal hydraulic fluid therein; and
   plunger means slidably disposed within said second hydraulic chamber and abutting said rolling elastomeric diaphragm, whereby an inward displacement of said plunger means in an axial direction deflects said rolling elastomeric diaphragm to reduce the volume of said second hydraulic chamber and apply operative pressure against said self-resetting diaphragm and disk in said first hydraulic chamber, and whereby said self-resetting diaphragm, after a release of the inward displacement of said plunger means, returns said rolling elastomeric diaphragm and plunger means to their original positions.

2. The hydraulic remote control apparatus of claim 1 wherein said first and second hydraulic chambers are cylindrical and the ratio of diameter of said first hydraulic chamber to said second hydraulic chamber is in the range of about 1:1 to 10:1.

3. The hydraulic remote control apparatus of claim 2 wherein the ratio of diameter of said first hydraulic chamber to said second hydraulic chamber is 4:1.

4. The hydraulic remote control apparatus defined in claim 1 which is further characterized by having:
   a cover member interconnecting said second hydraulic chamber and said fluid-carrying conduit and adapted to secure said rolling elastomeric diaphragm to said housing.

5. The hydraulic remote control apparatus defined in claim 1 wherein said first hydraulic chamber is characterized by two interconnecting cylindrical members disposed in relation to said diaphragm and disk so that said diaphragm and disk can be secured therebetween.

6. The hydraulic remote control apparatus of claim 1 wherein said operating member enclosed within the operating compartment of said first hydraulic chamber is associated with and controls the movement of a short-stroke valve.

* * * * *